United States Patent
Hall

[11] Patent Number: 5,993,993
[45] Date of Patent: Nov. 30, 1999

[54] UNREGULATED SPACECRAFT ELECTRICAL BUS

[75] Inventor: John C. Hall, Saratoga, Calif.

[73] Assignee: Space Systems/Loral, Inc., Palo Alto, Calif.

[21] Appl. No.: 09/055,860

[22] Filed: Apr. 6, 1998

Related U.S. Application Data

[63] Continuation-in-part of application No. 08/955,931, Oct. 22, 1997, Pat. No. 5,948,556.

[51] Int. Cl.$^6$ .............................. H01M 2/00; H01M 4/48; H01M 4/58
[52] U.S. Cl. ...................... 429/163; 429/164; 429/167; 429/144; 429/61; 429/231.8; 429/231.95
[58] Field of Search ........................... 429/231.8, 231.95, 429/61, 144, 163, 167

[56] References Cited

U.S. PATENT DOCUMENTS

| | | | |
|---|---|---|---|
| 5,654,114 | 8/1997 | Kubota et al. | 429/218 |
| 5,786,107 | 7/1998 | Stafford et al. | 429/163 |
| 5,886,499 | 3/1999 | Hall | 320/101 |
| 5,898,291 | 4/1999 | Hall | 320/121 |

*Primary Examiner*—Maria Nuzzolillo
*Assistant Examiner*—Angela J. Martin
*Attorney, Agent, or Firm*—Perman & Green, LLP

[57] ABSTRACT

A spacecraft battery system is of a mass efficient design without voltage regulation of the battery resulting in increased satellite reliability, lower bus voltage noise and EMI susceptibility, and lower cost. It calls for a battery which includes a plurality of electrically connected cells, each of the cells having a positive electrode, a graphitic negative electrode, and a dielectric separator intermediate the positive electrode and the graphitic negative electrode and an unregulated bus electrically connecting the battery and a load for the operation thereof. The battery is preferably a lithium ion battery in which the material of the positive electrode is selected from the group consisting of $Li_xMn_2O_4$, $Li_xNiO_2$, $Li_xCoO_2$, $Li_xCo_yNi_{1-y}O_2$ where x and y >/=1 and in which the material of the positive electrode is selected from the group consisting of petroleum coke, graphite, and $SnO_2$. In one embodiment of the invention, the design and assembly of such batteries is particularly economical, yet tailored to meet the power requirements of specialized spacecraft. According to this embodiment, a very large number of small battery cells are assembled electrically in parallel into a cell module to provide a larger ampere hour capacity and, in turn, multiple cell modules are series connected into a spacecraft battery having the required power. This embodiment provides for (a) three dimensional packaging of parallel cells, (b) rejecting the internal heat from such a package, and (c) providing redundant electrical fuse protection for the internal cell array.

19 Claims, 10 Drawing Sheets

UNREGULATED SPACECRAFT ELECTRICAL BUS

This is a continuation-in-part of, commonly assigned, application Ser. No. 08/955,931 filed Oct. 22, 1997, U.S. Pat. No. 5,948,556, entitled "Massively Parallel Spacecraft Battery Cell Module Design".

BACKGROUND OF THE INVENTION

1. Field of the Invention

The present invention relates generally to batteries for spacecraft applications and, more particularly, to a mass efficient spacecraft design without voltage regulation of the battery resulting in increased satellite reliability, lower mass, lower thermal load, lower bus voltage noise and EMI susceptibility, and lower cost. In one embodiment of the invention, the design and assembly of such batteries is particularly economical, yet tailored to meet the power requirements of specialized spacecraft. More specifically, according to this embodiment, a very large number of small battery cells are assembled electrically in parallel into a cell module to provide a larger ampere hour capacity and, in turn, multiple cell modules are series connected into a spacecraft battery having the required power. The invention provides for (a) three dimensional packaging of parallel cells, (b) rejecting the internal heat from such a package, and (c) providing redundant electrical fuse protection for the internal cell array. In short, the invention provides a unique methodology for utilizing mass produced electrochemical cells in low volume applications thereby reducing production and development costs and enables the provision of batteries with flexible capabilities for specialized applications.

2. Description of the Prior Art

As noted in the disclosure of application Ser. No. 08/955,931 filed Oct. 22, 1997, pending, satellite electrical power systems are classified as either regulated or unregulated. The difference is whether the power system voltage, when operated on the batteries, is regulated by a DC to DC converter or the satellite is powered directly by the battery In the latter case the satellite electrical loads must be designed to operate over the voltage range of the battery discharge which may include added radiator to compensate for thermal efficiency of the payload (it is not clear that this is a problem in eclipse battery operation). To maximize payload efficiency, the battery must operate over as narrow a voltage range as possible. This in turn requires for an unregulated bus that battery cells be redesigned when the satellite power is changed as the battery voltage must be fixed. Thus battery watt hour capacity can only be determined by the battery cell ampere-hour capacity.

As just noted, the regulated bus solves these problems through the DC to DC converter. This solution, however, comes at the price of added satellite weight and cost due to the converter, added battery weight in order to compensate for the discharge converted inefficiency, and possibly added thermal radiator to compensate for converter inefficiency.

As noted in the disclosure of application Ser. No. 08/955,931 filed Oct. 22, 1997, pending, at the present time, spacecraft batteries are typically built with custom fabricated cells built to match the required battery ampere hour capacity. This requires that new cell sizes be developed and manufactured as the required battery ampere hour capacity is changed. This in turn leads to specialized high cost, low volume, production facilities due to the limited cell quantities required for spacecraft use and the number of different sizes required. In addition, high quality is difficult to achieve in such production facilities as the quantities make it difficult to implement statistical process control and many of the manufacturing steps are carried out by hand. An alternative approach is to build batteries based on parallel arrays of smaller cells which may be commercially available, although this is not a requirement of the invention. These arrays are then connected in series to yield the required battery voltage and capacity. Difficulties with this approach are that (a) a short circuit will short out the entire parallel array, (b) such arrays are typically volumetrically inefficient due to the small height of a typical commercial cell compared with a larger custom design, and (c) if the cells are packaged in a three dimensional array for improved volumetric efficiency, waste heat cannot be efficiently removed from the interior of the cell array.

An alternative to respecifying ampere-hour cell capacity is to use a fixed capacity and DC to DC conversion. This approach, however, adds mass (by reason of the converter) and increases battery weight due to the inefficiency of the converter.

Additionally, it is customary for a known battery systems to incorporate appropriate electronics to automatically by-pass a mal-functioning cell. This electronics is costly, occupies limited space, and adds to the weight of the system.

Thus, it was determined to be desirable to assemble into a cell module a very large number of small battery cells, electrically in parallel, to provide a larger ampere hour capacity and, in turn, multiple cell modules are series connected into a spacecraft battery having the required power. That technique provides for (a) three dimensional packaging of parallel cells, (b) rejecting the internal heat from such a package, and (c) providing redundant electrical fuse protection for the internal cell array. Thus, at least first and second modules are provided, each being of plural commonly aligned, parallel bussed, electric cells, each cell including opposed ends and an outer peripheral surface. The cells are disposed in a planar side-by-side relationship, and each module includes a plurality of outermost cells encompassing an interior region. The modules are connected electrically in series and are laterally coextensive and aligned in end to end relationship. A heat sink is provided including a heat conductive body having a radiative surface facing deep space and heat shunts extend between the interior regions of the modules and the radiative surface. Fuse devices are provided in series with each of the electric cells and responsive to excessive current flow to sever connection of its associated said electric cell from said battery system.

Key elements of the technique recited in the disclosure of application Ser. No. 08/955,931 filed Oct. 22, 1997, pending, mentioned above, include the following:

Arraying small cylindrical or prismatic cells in parallel with multiple fuse protection. In one preferred embodiment for the invention, a large number of "18650" (that is, 18 mm in diameter, 650 mm long) lithium ion cells are bussed in parallel protected with one or more of the following three protective fuses:
   (i) a cell internal thermal fuse which irreversibly shuts down the cell in case of an internal short circuit;
   (ii) a cell automatically resetting thermal fuse which shuts down the cell in case of a transient high current short circuit; and
   (iii) an electrical fuse which is sized at between 1C and 10C current.

A three dimensional array of individual cells. The three dimensional array is achieved by bussing two dimensional parallel layers followed by stacking layers physically and parallel connecting individual layers; and Creating an internal thermal design inside the three dimensional array which shunts heat across individual layers to vertical thermal shunts which act to conduct heat to a spacecraft thermal radiator.

Building upon the foregoing, it is well known that satellite electrical power systems are classified as either regulated or unregulated. The difference is whether the power system voltage, when operated on the batteries, is regulated by a DC to DC converter or the satellite is powered directly by the battery. In the latter case the satellite electrical loads must be designed to operate over the voltage range of the battery discharge which may include added radiator to compensate for thermal efficiency of the payload (it is not clear that this is a problem in eclipse battery operation). To maximize payload efficiency (and in turn minimize any thermal and battery effects), the battery must be designed to discharge over a narrow voltage range. This in turn requires for an unregulated bus that battery cells be redesigned when the satellite power is changed as the battery voltage must be fixed. Thus battery watt hour capacity can only be determined by the battery cell ampere-hour capacity.

As earlier noted, the regulated bus solves these problems through the DC to DC converter This solution, however, comes at the price of added satellite weight and cost due to the converter, added battery weight in order to compensate for the discharge converted inefficiency, and possibly added thermal radiator to compensate for converter inefficiency.

It was with knowledge of the foregoing that the present invention has been conceived and is now reduced to practice.

SUMMARY OF THE INVENTION

A spacecraft battery system is of a mass efficient design without voltage regulation of the battery resulting in increased satellite reliability, lower bus voltage noise and EMI susceptibility, and lower cost. It calls for a battery which includes a plurality of electrically connected cells, each of the cells having a positive electrode, a graphitic negative electrode, and a dielectric separator intermediate the positive electrode and the graphitic negative electrode and an unregulated bus electrically connecting the battery and a load for the operation thereof. The battery is preferably a lithium ion battery in which the material of the positive electrode is selected from the group consisting of $Li_xMn_2O_4$, $Li_xNiO_2$, $Li_xCoO_2$, $Li_xCo_yNi_{1-y}O_2$ where x and y $>/=1$ and in which the material of the negative electrode is selected from the group consisting of petroleum coke, graphite, and $SnO_2$. In one embodiment of the invention, the design and assembly of such batteries is particularly economical, yet tailored to meet the power requirements of specialized spacecraft. More specifically, according to this embodiment, a very large number of small battery cells are assembled electrically in parallel into a cell module to provide a larger ampere hour capacity and, in turn, multiple cell modules are series connected into a spacecraft battery having the required power. The invention provides for (a) three dimensional packaging of parallel cells, (b) rejecting the internal heat from such a package, and (c) providing redundant electrical fuse protection for the internal cell array. In short, the invention provides a unique methodology for utilizing mass produced electrochemical cells in low volume applications thereby reducing production and development costs and enables the provision of batteries with flexible capabilities for specialized applications.

Accordingly, a primary feature of the invention is to provide a mass efficient spacecraft design without voltage regulation of the battery resulting in increased satellite reliability, lower mass, lower thermal load, lower bus voltage noise and EMI susceptibility, and lower cost.

Another feature of the invention is a technique of providing batteries for spacecraft applications which is economical, yet tailored to meet the power requirements of specialized spacecraft.

A further feature of the invention is to provide a lithium ion battery for spacecraft use designed to operate between the maximum bus voltage and 20% state of charge.

Still another feature of the invention is to provide such a technique according to which a very large number of small battery cells are assembled electrically in parallel into a cell module to provide a larger ampere hour capacity and, in turn, multiple cell modules are series connected into a spacecraft battery having the required power.

A further feature of the invention is to provide such a technique which provides for (a) three dimensional packaging of parallel cells, (b) rejecting the internal heat from such a package, and (c) redundant electrical fuse protection for the internal cell array.

Still another feature of the invention is to provide a unique methodology for utilizing mass produced electrochemical cells in low volume applications thereby reducing production and development costs. Development costs are reduced as only one cell size has to be developed. The ideal battery capacity (Ah) is then obtained by a parallel connection of these cells.

Yet another feature of the invention is to provide such a unique construction which assures the efficient extraction of heat from the assembly.

Still a further feature of the invention is to provide such a unique construction which minimizes the mounting foot print area and the thermal radiator panel area of the battery system.

Yet a further feature of the invention is to provide such a unique construction which assures adequate fuse protection enabling continued operation of the battery notwithstanding the failure of one or more individual cells.

Still another feature of the invention with respect to redundancy is to provide such a battery system in which the mass gain by adding an extra cell in parallel to one of 25 modules, for example, in series, is less than that of adding an extra module whenever the number of cells per parallel module is greater than the number of series connected modules.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
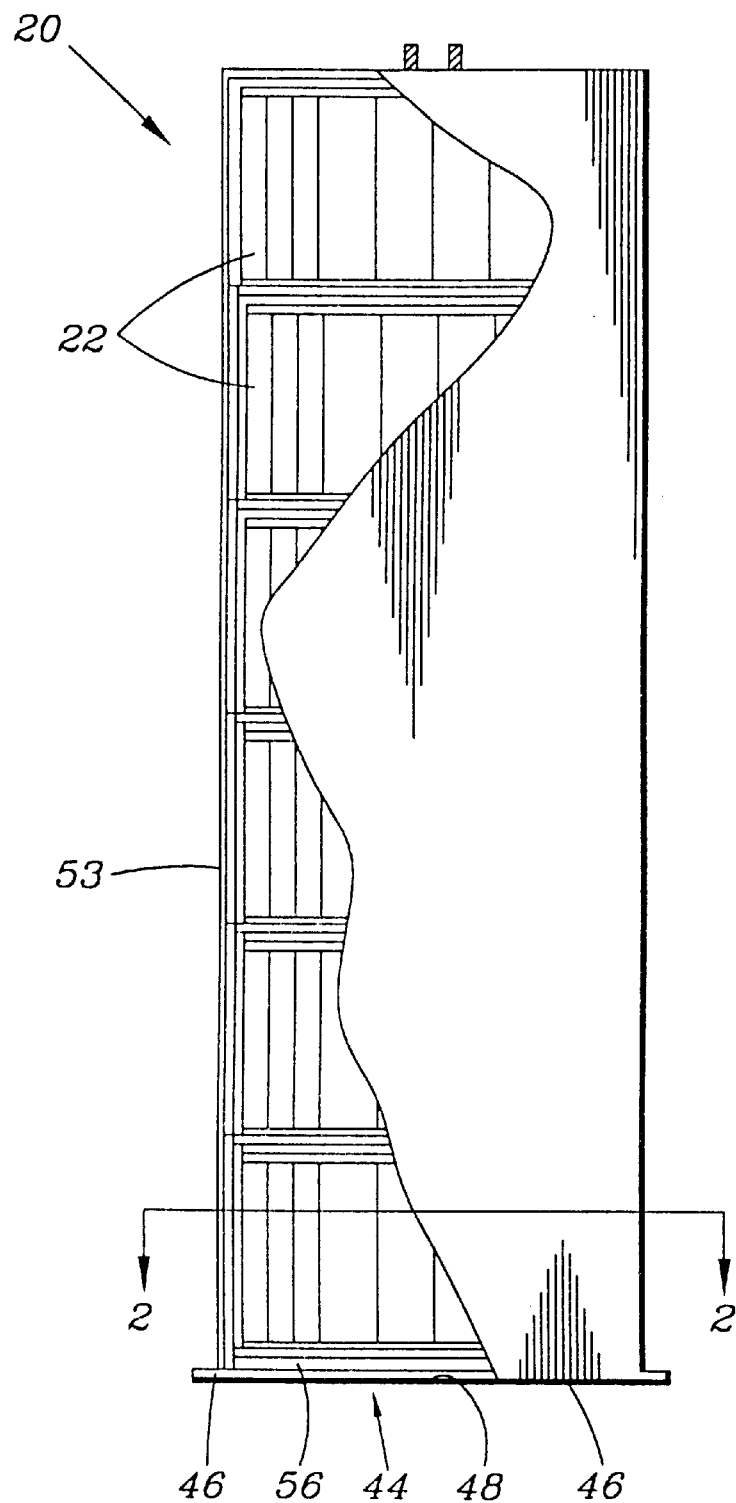
FIG. 1 is a side elevation view, certain parts being cut away and shown in section, of a spacecraft battery cell module embodying the present invention.
Figure 4:
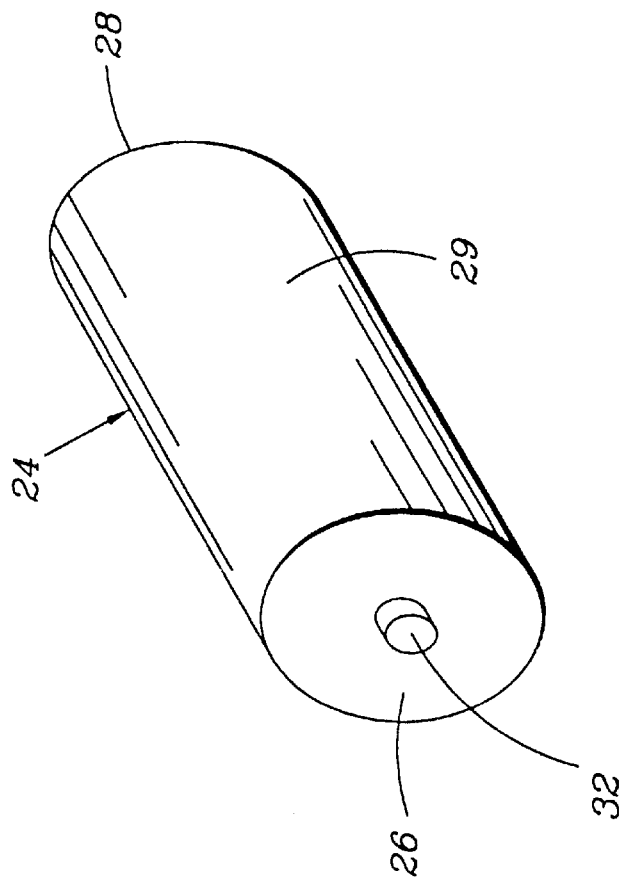
FIG. 4 is a detail perspective view of a typical cell employed by the battery system of FIG. 1.
Figure 2:
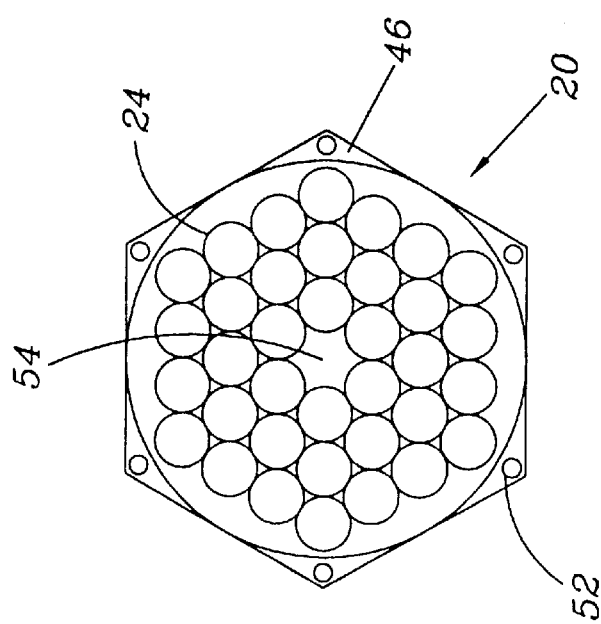
FIG. 2 is a cross section view taken generally along line 2—2 in FIG. 1.
Figure 3:
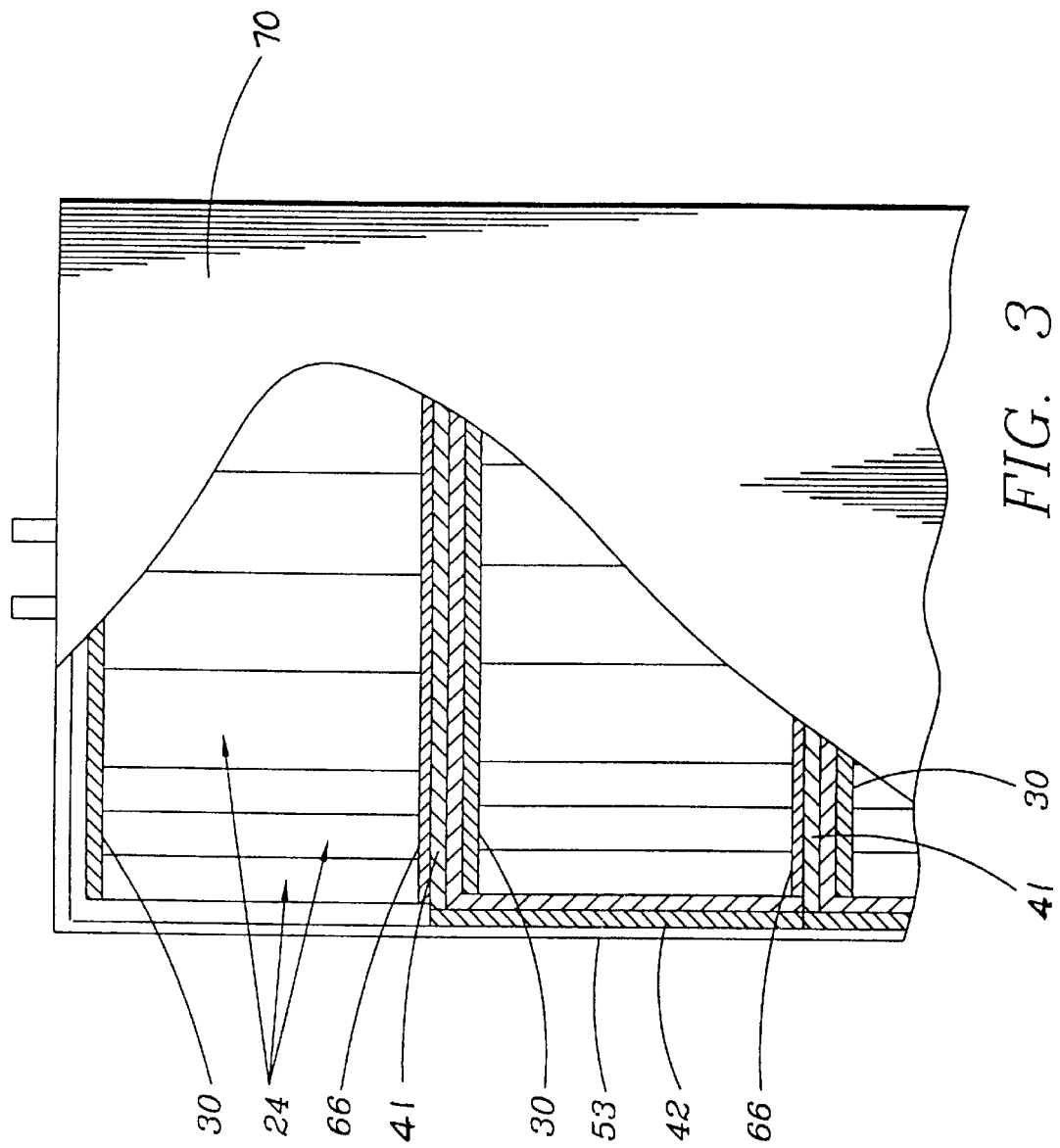
FIG. 3 is a detail side elevation view of parts illustrated in FIG. 1, certain parts being cut away and shown in section.

Turn now to the drawings and, initially, to FIGS. 1, 2, and 3 which illustrate a spacecraft battery cell module 20 of the type disclosed in co-pending application Ser. No. 08/955,931 filed Oct. 22, 1997 comprising a plurality of tiers or layers 22 in a stacked relationship. Each of the tiers or layers 22 includes a large number of commonly aligned electric cells 24 (FIG. 4), each of the cells including opposed ends 26, 28 and an outer peripheral surface 29. While the electric cells 24 may be commercially available, this is not a requirement of the invention. Longitudinal axes of the electric cells 24 are generally aligned with the longitudinal axis of the battery cell module 20. A positive terminal collector 30 extends laterally across the entire width dimension of the battery cell module 20 in engagement with positive terminals collector 32 of each of the electric cells 24 and thereby busses all of the electric cells of layer 22 in parallel, all of the electric cells being disposed in a planar side-by-side relationship (see especially FIG. 2).

In the instance illustrated in FIGS. 1–3, which is descriptive only and not intended to be restrictive of the invention, 36 1.35 ampere hour "18650" lithium ion cells are bussed in parallel to create a 48.6 Ah cell layer. As seen in FIG. 1, the cells are arrayed in six horizontal layers which are stacked on top of another to form a cell module structure which is 17 inches high and 5.8 inches in diameter. This geometry in effect reduces the foot print area of the cell module by a factor of six versus conventional art which utilizes a two dimensional array of electric cells.

Figure 5:
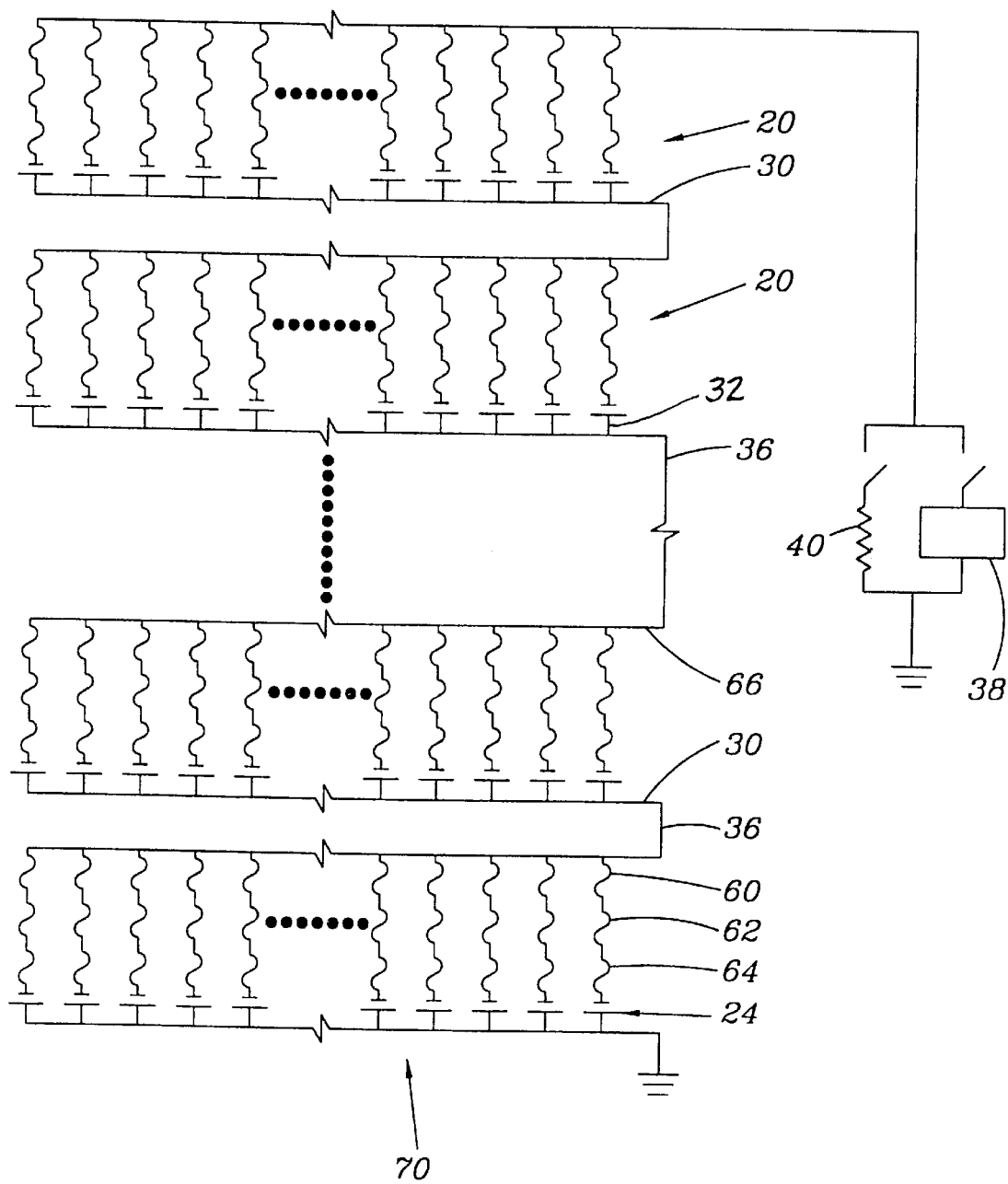
FIG. 5 is an electrical schematic illustrating the battery system of FIG. 1.

All of the layers 22 are laterally coextensive and aligned in end to end relationship and the successive modules are connected electrically in series as illustrated in FIG. 5 by means of a series bus 36 (FIG. 5). In a typical fashion, the modules 22 are electrically connected to a charging power supply 38 and load 40. The layers 22 are so sized, that, when combined into the battery cell module 20, they provide an output matched to meet the power requirements of the spacecraft in which the battery system is intended to be incorporated.

Heat is extracted from the battery cell module 20 illustrated in FIG. 1 first by transverse or radial (if indeed the module 20 is cylindrical) heat shunts 41 (FIG. 3) at each layer. These shunts are thermally connected to an axial heat shunt 42 to conduct heat to the base of the module which is in turn thermally attached to a spacecraft heat removal system 44. The connection shown in FIG. 5 is between FIG. 1 modules. The heat removal system might, for example, include a heat conductive body such as a honeycomb mounting panel 46 having a radiative surface 48 facing deep space. The lowermost cell layer 22 is attached to an inside face 50 of this mounting panel and optical space radiators (not shown) may be attached to an opposite face of the panel comprising the radiative surface 48. In this example therefore heat is transversely conducted by the heat shunt 41 to the thermally conductive axial heat shunt 42 and thereby axially conducted to the honeycomb mounting panel 46 and then radiated to deep space from the radiative surface 48. The mounting panel 46 is also preferably formed with a plurality of peripherally spaced mounting holes 52 for attachment of the battery cell module 20 to the spacecraft.

The entire battery cell module is preferably enclosed by means of a suitably constructed and attached outer shell 53 (FIG. 3) and an entire battery system 70 (FIG. 5) is comprised of a plurality of cell module systems 20 connected in series.

The above example illustrates one of the key features of the present invention in that the required projected area of the honeycomb mounting panel 46 is reduced by a factor of six over the conventional art. For lithium ion batteries which are often used on spacecraft, this is a critical advantage as the waste heat generated by these batteries is low relative to the radiative surface area of a possible mounting panel. A conventional two dimensional design consumes excessive radiative surface area which could be more efficiently used by other thermal loads in the spacecraft. Thus, the packaging approach of the invention enables a more thermally efficient and higher power spacecraft.

In the particular example illustrated in FIGS. 1–3, the transverse or radial heat shunts 40 could be disks of aluminum, copper, graphite or other suitable thermally conductive materials. Note that such disks may also serve as a parallel current collector for the individual cells. The axial heat shunt 42 could be an aluminum or graphite composite tube. Alternatively, heat may be axially removed by a heat pipe positioned, for example, at the center or interior region 54 of each layer 22, the interior region 54 being defined and encompassed by an outermost grouping of the electric cells 24 as seen in FIG. 2.

This latter approach may be particularly preferred in cases where a low intercell temperature gradient is required in order to maximize cell life. Still another feature of the invention is that the layer 22 adjacent the mounting panel 46 is thermally insulated from the layer base by means of a suitable insulation layer 56 in order to prevent excessive cooling of these cells.

Viewing FIG. 5, a battery 70 is illustrated comprising a plurality of the cell modules 20 in series. The lithium ion cells referred to in the above example are commonly manufactured with an internal thermally fusible separator or fuse 64 that shuts the cell down in case of an internal short circuit and a reversible thermal fuse 62 that stops the flow of current in the event that the cell accidentally overheats. The reversible thermal fuse 62 may be, for example, a PTCR (positive temperature conductive resistor) of the type composed of a conductive polymer which undergoes a phase transformation when heated, changing volume and thereby going to open circuit but which reverts to closed circuit when it cools. In addition, each cell 24 is typically connected to the parallel bussing system, namely, between the positive terminal collector 30 and a negative terminal plate 66, with a 1 to 2 amp electrical fuse 60.

A particular advantage of the invention is that the parallel array is intrinsically reliable as a result of a multitude of individual units, none of which can fail the module. It is difficult to conceive, in the absence of a external catastrophic event (e.g., meteor impact), that a cell module constructed in accordance with the invention would fail short. This may eliminate the need to include extra cell modules in space battery designs inasmuch as the subject of this disclosure is internally redundant.

A problem with a parallel array such as described may occur if the charge acceptance of the cells is not uniform in which event some cells may be subjected to excess over charge or over discharge. The over discharge issue is addressed by limiting the normal high power depth of discharge to 80% of rated capacity. The overcharge issue is overcome by taper charging the module such that at the top of charge the cell voltage becomes the same as the reverse cell potential.

Figure 6:
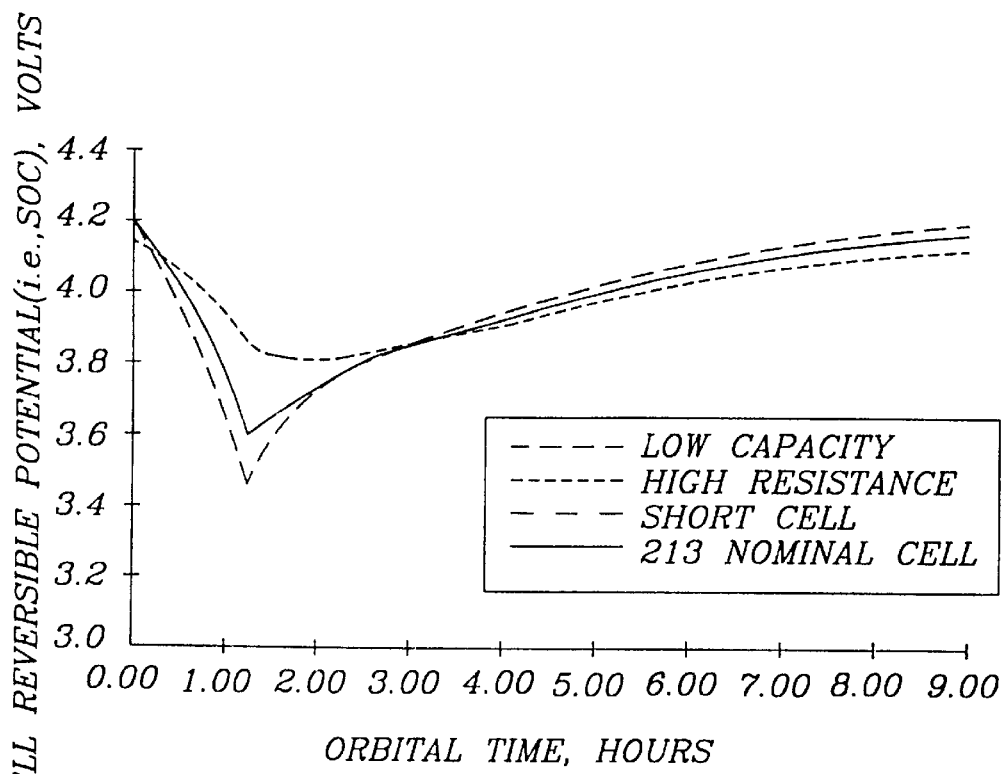
FIG. 6 is a graph displaying the cell reversible potential as a function of time for a charge-discharge cycle of 213 nominal cells and 3 abnormal cells in parallel comprising a module.
Figure 7:
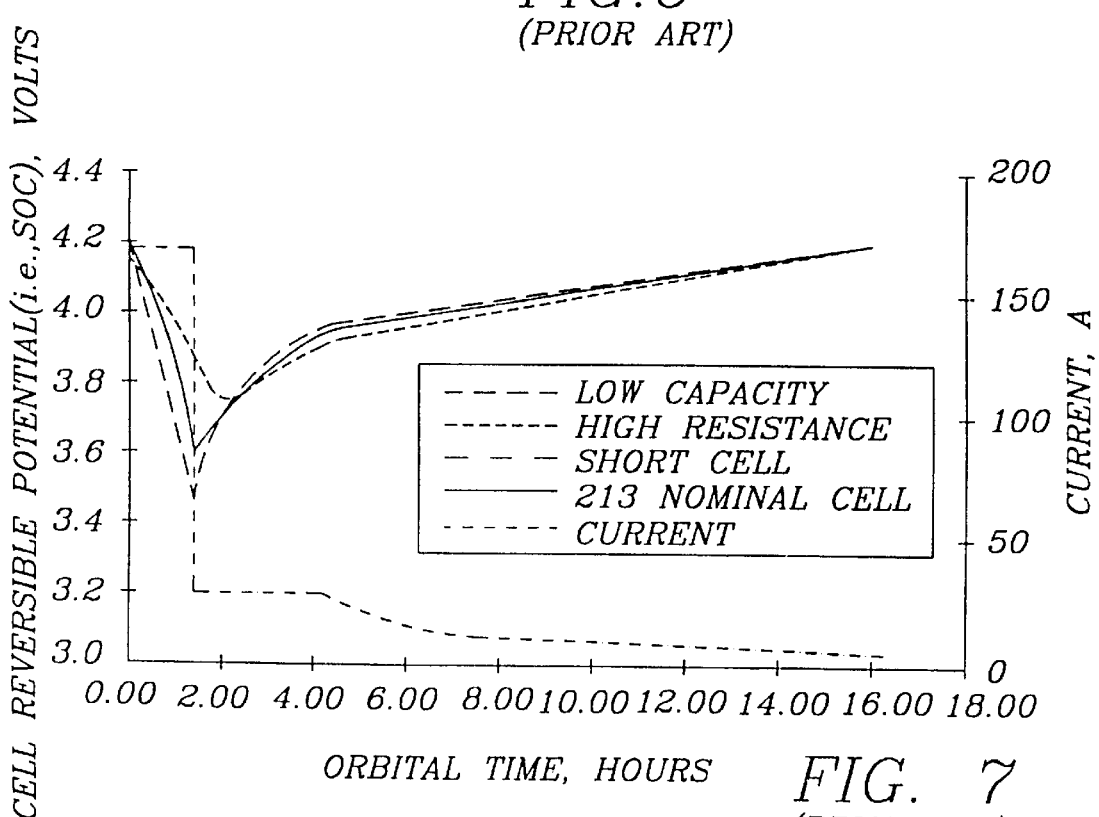
FIG. 7 is a graph, similar to FIG. 6, wherein maximum charge is achieved using a taper charge.

Viewing FIGS. 6 and 7, these effects have been modeled for a 216 cell array or module which includes: (a) a cell with an abnormal high resistance, (b) a cell with a low grade short circuit, and (c) a cell with a low capacity. In both figures, the curves for the short cell and for the 213 nominal cells are coincident. The spread sheet model was based on Ohm's law. As shown in FIG. 6, without taper charge, a low charge acceptance cell will actually be overcharged relative to the population. While its voltage matches that of the array less current flows through the cell and thus its; and reversible potential (i.e. open circuit voltage) is higher such that it is charged to a higher state of charge and overcharged relative to the population.

As shown in FIG. 7, when taper charge or constant voltage current clamped charge is practiced, the voltages of all cells approach a common value of the reversible potential as the state of charge increases, that is, at the end of the charging process. In this case, overcharge of the off normal cells is avoided which would otherwise lead to their further degradation and a possible snowballing effect. It is meaningful to note that a fundamental problem heretofore with parallel arrays is cell imbalance, that is, that cell potentials are not the same at the end of a charge session; this is undesirable because operating at an excessively high potential leads to parasitic reactions which further decrease capacity. Thus as illustrated in FIG. 6, a low capacity cell will have its capacity further reduced by being charged to a higher potential at the end of each charging cycle.

While a high resistance cell has a lower cell potential which is desirable for that particular cell, this is an undesirable condition for the battery system as a whole because the system voltage is the arithmetic average of the voltages of all the cells. Because of this, the good cells are caused to operate at a higher potential than that at which they would otherwise or normally operate. However, this condition is avoided by the present invention.

Figure 9:
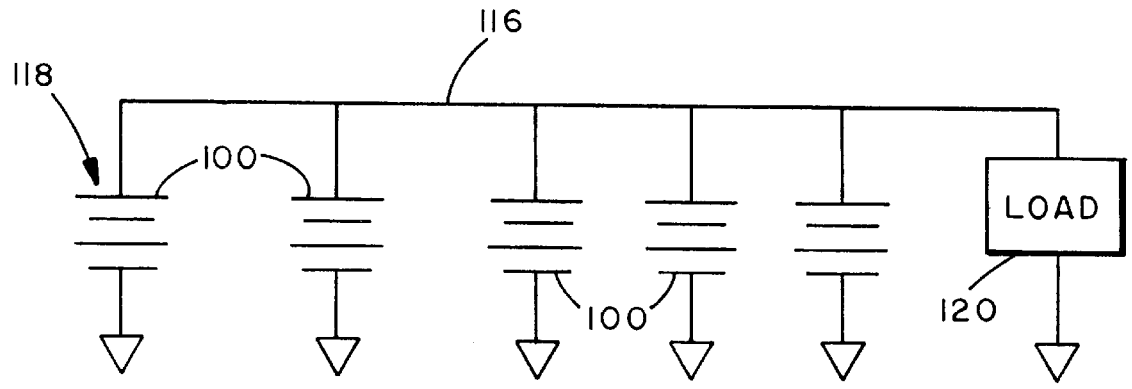
FIG. 9 is a schematic view illustrating an unregulated bus connecting a battery and a load according to the invention.
Figure 8:
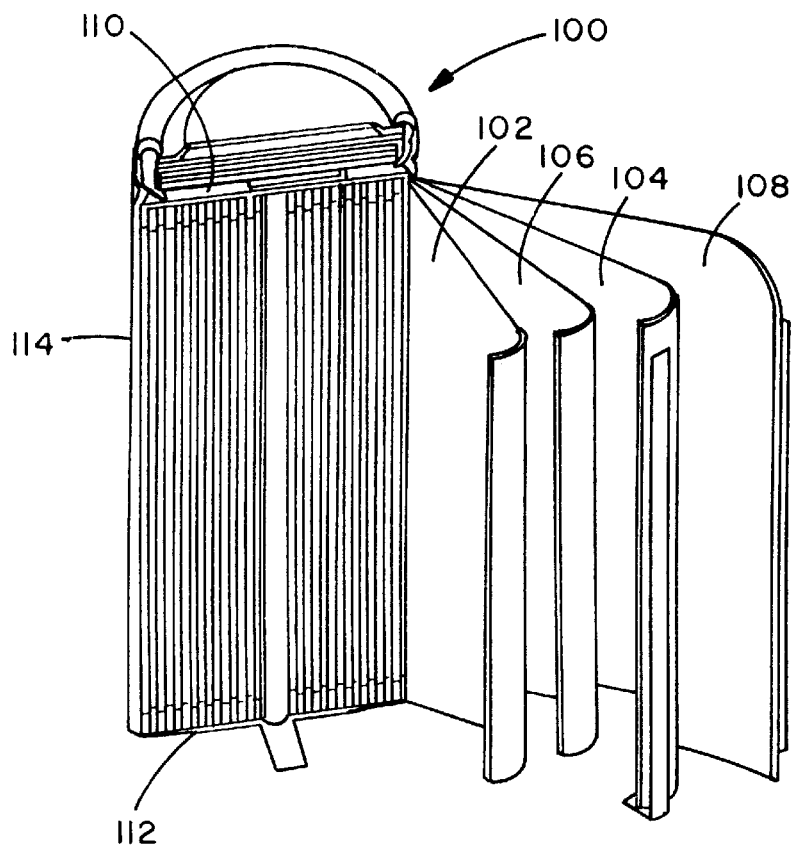
FIG. 8 is a cutaway perspective view, partly in section, of a battery cell embodying the invention.

For a specific description of the present invention, turn now initially to FIG. 8 which is a cut away perspective view of a lithium ion cell 100 which may be one of a plurality of like cells, electrically connected, comprising, for example, the battery system 20. In this instance, the cell 100 includes a positive electrode 102 and a graphitic negative electrode 104. The positive electrode 102 is of a material selected from the group consisting of $Li_xMn_2O_4$, $Li_xNiO_2$, $Li_xCoO_2$, $Li_xCo_yNi_{1-y}O_2$ where x and y >/=1. In a similar fashion, the negative electrode 104 is of a material selected from the group consisting of petroleum coke, graphite, and $SnO_2$. A suitable dielectric separator 106 is positioned intermediate the positive electrode 102 and the graphitic negative electrode 104. Indeed, a second dielectric separator 108 may complete encapsulation of the negative electrode 104 and itself be encased by top and bottom insulators 110, 112, respectively, and an encapsulating metal can 114. In this context, as schematically illustrated in FIG. 9, a bus 116 is an unregulated bus electrically connecting a battery 118 comprised of a plurality of such cells 100 for the operation of a load 120.

It will be appreciated that the "massively parallel" battery construction exemplified by the battery cell module 20 is a preferred way of implementing the present invention, for the reason that it does not require redesigning the battery for each new use either by (a) overbuilding the battery so as to accommodate all anticipated power needs or (b) custom engineering cells to the particular application. However, the present invention need not be limited to the "massively parallel" configuration.

Figure 10:
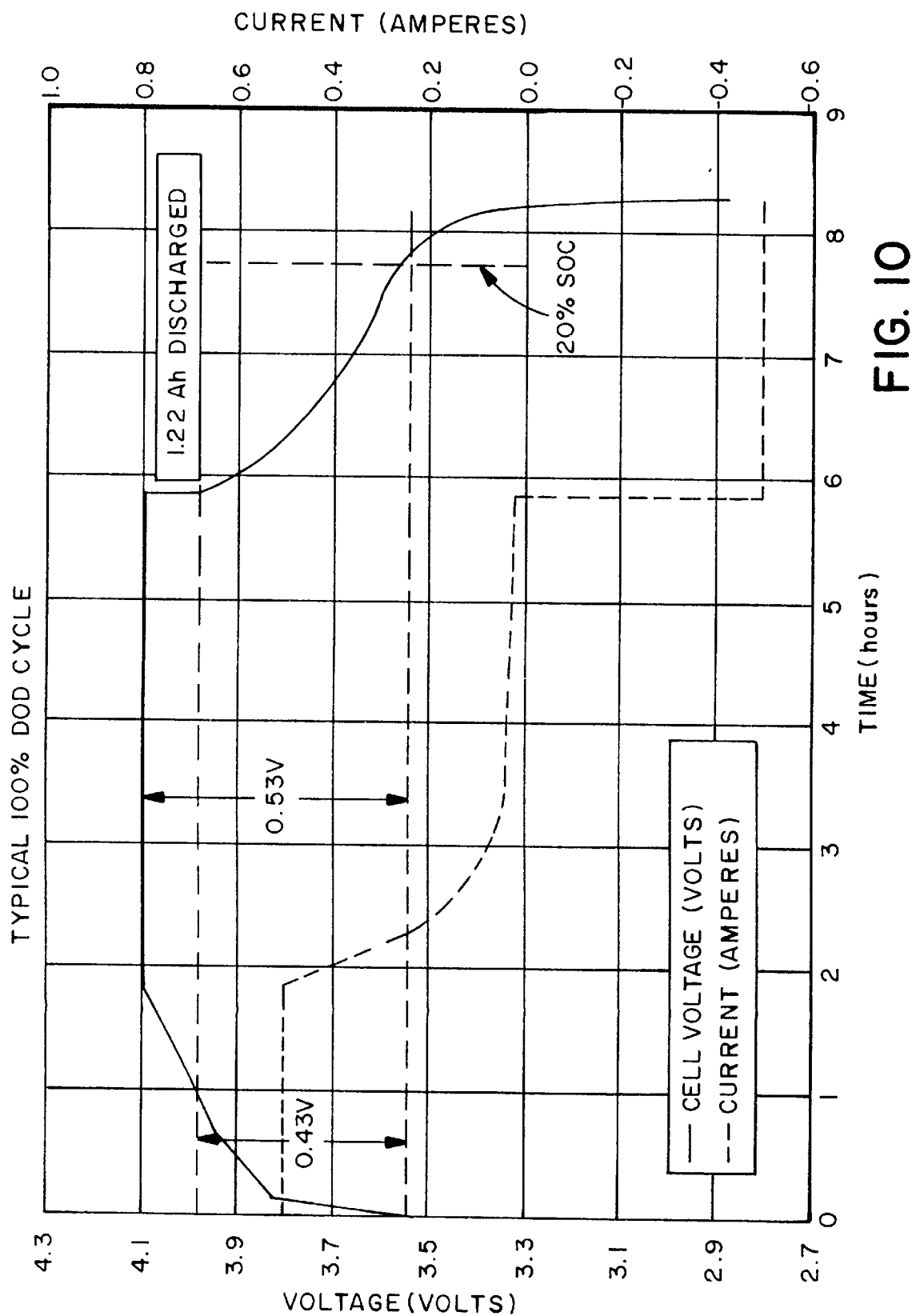
FIG. 10 is a graph of the voltage and current of a typical lithium ion cell during charge and discharge.

Critical features of lithium ion cells with respect to the bus regulation strategy are:

(1) The degree to which the charging voltage increases is limited by tapering of the current as seen in FIG. 10;

(1) As seen in FIG. 10, the voltage change as the cell is discharged from 100% to 20% state of charge is 0.43 V corresponding to 10.3 V in a 24 cell battery. As also seen in FIG. 10 for the complete charge discharge cycle, the voltage change to 20% state of charge is 0.53 V per cell (12.7 V per 24 cell battery).

Figure 11:
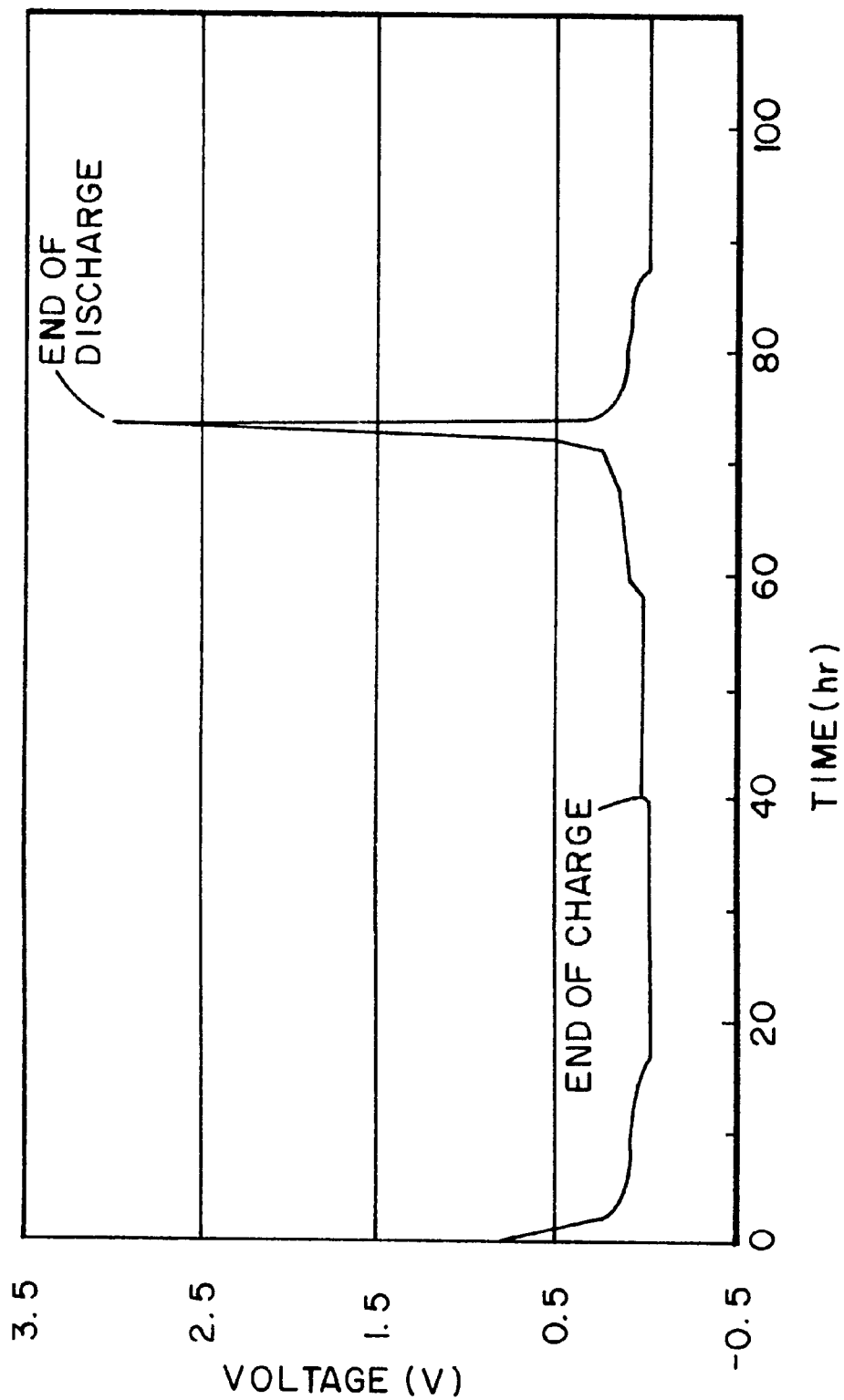
FIG. 11 is a graph of the charge and discharge of a graphite type negative electrode material used in lithium ion cells.
Figure 12:
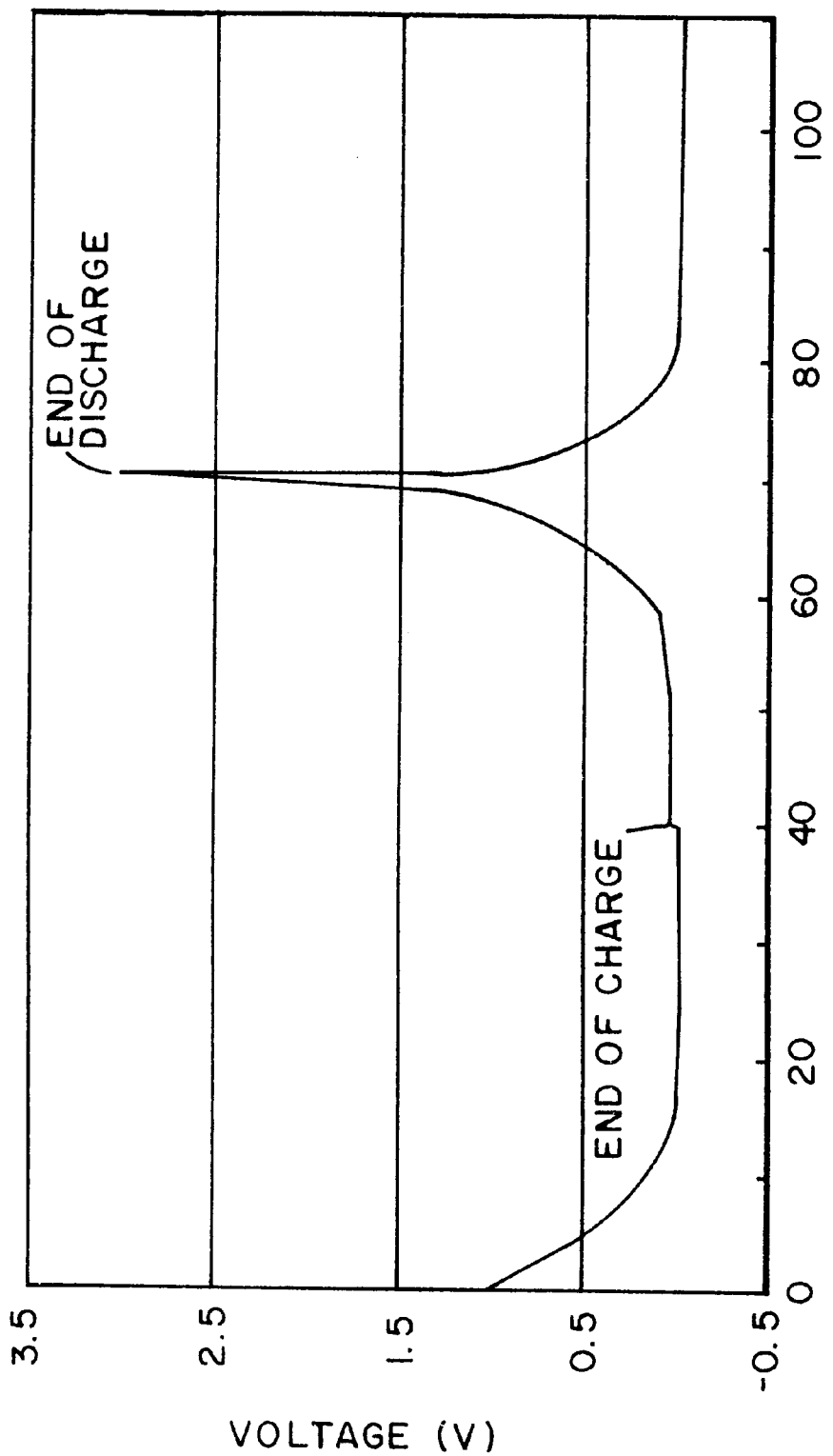
FIG. 12 is a graph of the charge and discharge of a disordered carbon type negative electrode material used in lithium ion cells.

(1) As seen in FIGS. 11 and 12, this voltage change may be further restricted by the choice of carbon material, graphite operating over a much narrower voltage range rclntive to carbon.

Figure 13:
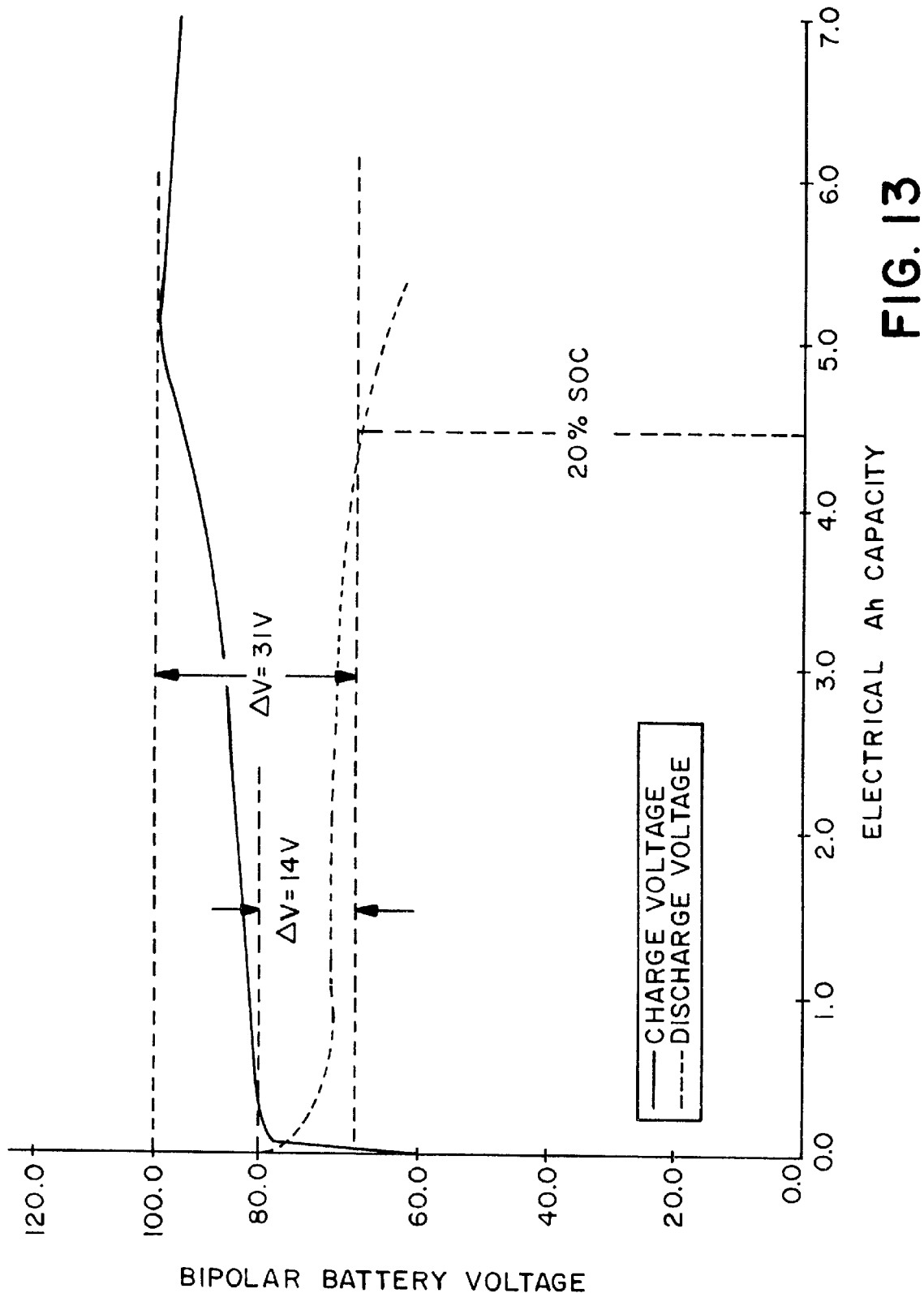
FIG. 13 is a graph of the charge-discharge behavior of a very low impedance nickel hydrogen 100 V bipolar battery.

The voltage range over which a lithium ion cell operates is much narrower than a present day nickel hydrogen spacecraft battery. As seen in FIG. 13, even with a very low impedance bipolar design a 100 V nickel hydrogen battery will span a 31 V range between full charge and a 20% state of charge. This in turn will lower payload efficiency when operated on a nickel hydrogen battery without a DC to DC converter due to the increased voltage change when compared with a lithium ion battery.

This is particularly true if maximum charging voltage of the battery required to be less than the bus voltage (the typical case when the battery is always connected to the bus). Even if the battery is charged off the bus, a lithium ion battery will span a lower voltage range than a best case nickel hydrogen battery. Thus, the lithium ion battery is more capable of efficiently supporting a payload without a DC to DC converter as a result of:

(1) the lower change in discharge voltage of lithium ion batteries vs. nickel hydrogen batteries;

(1) the reduced increase in charge voltage of lithium ion batteries vs. nickel hydrogen batteries particularly when current limited constant voltage charge top off (FIG. 10) is practiced; and (1) Use of the graphite negative material in the lithium ion battery which additionally reduces voltage changes during discharge.

As a result of these characteristics, an unregulated spacecraft electrical bus is enabled with a lithium ion battery. A spacecraft can thereby be realized in which payloads are supported during eclipse without a DC to DC converter between the battery and the payload.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A spacecraft battery system comprising:
   a battery including a plurality of electrically connected cells, each of said cells having a positive electrode, a graphitic negative electrode, and a dielectric separator intermediate said positive electrode and said graphitic negative electrode; and
   an unregulated bus electrically connecting said battery and a load for the operation thereof.

2. A spacecraft battery system as set forth in claim 1 wherein said battery is a lithium ion battery in which the material of said positive electrode is selected from the group consisting of $Li_xMn_2O_4$, $Li_xNiO_2$, $Li_xCoO_2$, $Li_xCo_yNi_{1-y}O_2$;
   where x and y >/=1; and
   wherein the material of said negative electrode is selected from the group consisting of petroleum coke, graphite, and $SnO_2$.

3. A spacecraft battery system comprising:
   at least first and second cell modules;
   each of said cell modules including a plurality of individual cells bussed in parallel, each of said cells including a positive electrode, a graphitic negative electrode, and a dielectric separator intermediate said positive electrode and said graphitic negative electrode; and
   an unregulated bus electrically connecting said battery and a load for the operation thereof.

4. A spacecraft battery system as set forth in claim 1 including:
   at least first and second cell modules; and
   wherein each of said cell modules includes:
      a first layer of plural commonly aligned electric cells, each of said cells including opposed ends and an outer peripheral surface and having a longitudinal axis, said cells being bussed in parallel and disposed in a planar side-by-side relationship, said first module including a plurality of outermost cells encompassing an interior region;
      at least a second layer of plural commonly aligned electric cells, each of said cells including opposed ends and an outer peripheral surface and having a longitudinal axis, said cells being bussed in parallel and disposed in a planar side-by-side relationship, said second module including a plurality of outermost cells encompassing an interior region;
      said second layer being connected electrically in parallel with said first layer, said first and second layers being laterally coextensive and axially aligned, said first and second modules providing an output matched to meet the power requirements of the spacecraft.

5. A spacecraft battery system as set forth in claim 4 wherein each of said cell modules includes:
   a heat sink spaced from said first layer and from said second layer; and
   a heat shunt for conducting heat to said heat sink means and away from said cells of said first layer and of said second layer.

6. A spacecraft battery system as set forth in claim 5 wherein, for each of said cell modules, said heat sink includes a heat conductive body having a radiative surface facing deep space; and said heat shunt extends between the interior regions of said first and second modules and said radiative surface.

7. A spacecraft battery system as set forth in claim 4 wherein each of said cell modules includes:
   an elongated housing having a longitudinal axis and containing said first and second layers, said housing having an outer peripheral surface and terminating at a radiative surface facing deep space; and
   wherein said heat shunt extends intermediate and contiguous to said first and second layers and from the interior regions to said radiative surface.

8. A spacecraft battery system as set forth in claim 7 wherein, for each of said cell modules, said heat shunt includes:
   a first heat shunt member extending between the interior regions of said first and second layers and said elongated housing; and
   a second heat shunt member extending alongside said elongated housing to said radiative surface.

9. A spacecraft battery system as set forth in claim 8 wherein each of said cell modules includes:
   a parallel bus which includes said first heat shunt member; and
   a parallel bus which includes said second heat shunt member.

10. A spacecraft battery system as set forth in claim 4 including:
    a fuse member in series with each of said electric cells and responsive to excessive current flow to sever connection of its associated said electric cell from said battery system.

11. A spacecraft battery system as set forth in claim 10 wherein for each of said cell modules, said fuse member includes at least one of:
    (a) a cell internal thermal fuse which irreversibly shuts down said cell in case of an internal short circuit; and
    (b) an automatically resetting thermal fuse which shuts down said electric cell in case of a transient high current short circuit; and
    (c) an electrical fuse sized at between 1C and 10C current.

12. A method of operating a spacecraft battery comprising the steps of:
    (a) electrically connecting in a battery a plurality of cells, each cell having a positive electrode, a graphitic negative electrode, and a dielectric separator intermediate the positive electrode and the graphitic negative electrode; and
    (b) using an unregulated bus, electrically connecting the battery and a load for the operation of the load.

13. A method of operating a spacecraft battery as set forth in claim 12
    wherein said battery is a lithium ion battery in which the material of said positive electrode is selected from the group consisting of $Li_xMn_2O_4$, $Li_xNiO_2$, $Li_xCoO_2$, $Li_xCo_yNi_{1-y}O_2$;
    where x and y >/=1; and
    wherein the material of said negative electrode is selected from the group consisting of petroleum coke, graphite, and $SnO_2$.

14. A method of operating a spacecraft battery as set forth in claim 12 including the step of:

(c) providing at least first and second cell modules wherein each of the cell modules includes a plurality of individual cells bussed in parallel, each of the cells including a positive electrode, a graphitic negative electrode, and a dielectric separator intermediate the positive electrode and the graphitic negative electrode.

15. A method of operating a spacecraft battery as set forth in claim 12 including the step of:

(c) taper charging the lithium ion battery to a voltage below the bus voltage.

16. A method of operating a spacecraft battery as set forth in claim 12 wherein each of said cell modules includes heat sink means spaced from the first layer and from the second layer; and including the step of:

conducting heat to the heat sink means and away from the cells of the first layer and of the second layer.

17. A method of operating a spacecraft battery comprising the steps of:

(a) providing a lithium ion battery;

(b) using an unregulated bus, electrically connecting the battery and a load for the operation of the load; and (c) operating the lithium ion battery between the maximum bus voltage and 20% state of charge.

18. A method of operating a spacecraft battery as set forth in claim 17 including the step of:

(d) taper charging of the lithium ion battery when maximum voltage is reached.

19. A method of operating a spacecraft battery as set forth in claim 17 including the step of:

(d) providing the lithium ion battery with a graphite negative electrode.

* * * * *